United States Patent [19]
Tanabe

[11] Patent Number: 5,727,243
[45] Date of Patent: Mar. 10, 1998

[54] SINGLE LENS REFLEX CAMERA

[75] Inventor: Yoshiaki Tanabe, Kanagawa-ken, Japan

[73] Assignee: Nikon Corporation, Tokyo, Japan

[21] Appl. No.: 494,557

[22] Filed: Jun. 22, 1995

[30] Foreign Application Priority Data

Jun. 23, 1994 [JP] Japan ................................ 6-164528

[51] Int. Cl.⁶ .................................................. G03B 15/00
[52] U.S. Cl. ................................................ 396/358
[58] Field of Search ............................ 354/152, 153, 354/156, 400; 396/354, 355, 358

[56] References Cited

U.S. PATENT DOCUMENTS

| | | | |
|---|---|---|---|
| 4,914,465 | 4/1990 | Saeousa et al. | 354/412 |
| 5,025,276 | 6/1991 | Kitazawa et al. | 354/152 |
| 5,253,007 | 10/1993 | Tokura et al. | 354/152 |
| 5,499,070 | 3/1996 | Miura | 354/152 |
| 5,517,275 | 5/1996 | Kusaka et al. | 354/402 |

FOREIGN PATENT DOCUMENTS 58-1136  1/1983  Japan.

Primary Examiner—Howard B. Blankenship
Assistant Examiner—Nicholas J. Tuccillo
Attorney, Agent, or Firm—Oliff & Berridge

[57] ABSTRACT

A single lens reflex camera which has improved high-speed photography operation. The mirror in the single lens reflex camera is controlled to reduce the time delay between a first time when the rear shutter blind closes the photo field and a second time when the mirror reaches the down position. The time delay is reduced by initiating the mirror down movement at least before the rear shutter blind closes the photo field and possibly before the front shutter blind even opens the photo field, depending on the exposure conditions.

19 Claims, 8 Drawing Sheets

SINGLE LENS REFLEX CAMERA

BACKGROUND OF THE INVENTION

1. Field of the Invention

This invention generally relates to a single lens reflex camera having an improved high-speed film exposure rate. In particular, the invention relates to an autofocus single lens reflex camera in which the main mirror is controlled to decrease the time between film exposures.

2. Description of Related Art

When the film is not being exposed in a conventional autofocus single lens reflex camera, the light entering the camera lens is reflected by a mirror positioned between the film and the camera lens. The light reflected by the mirror is directed to a view finder and other devices in the camera, such as a range measuring device. The range measuring device uses the light to detect the distance from a photographic subject to the camera, i.e. the subject range. The subject range is then used to control the focus lens in the autofocus camera to focus an image of the subject on the film. Therefore, light must be directed to the range measuring device between each film exposure so the focus lens can be controlled to focus the image of the subject. If light is not directed to the range measuring device between film exposures, the focus lens cannot be controlled and the image is very likely to be out of focus.

When the conventional single lens reflex camera exposes the film, the mirror is raised to allow the light to pass toward the film. After the mirror is raised, a shutter, which is positioned between the mirror and the film, opens and then closes to expose the film to the light. After the film is exposed, the mirror is lowered, again reflecting the light entering the camera lens toward the view finder, the range measuring device and other devices.

The shutter in a single lens reflex camera has a front blind and a rear blind. Before the film exposure begins, the front blind is closed and the rear blind is open. As the front blind opens to expose the film to the light, the light passes through the shutter. At the end of the film exposure, the rear blind closes, stopping the passage of light to the film.

Conventional single lens reflex cameras, as disclosed in Japanese Unexamined Patent Publication 58-1136, initiate the lowering of the mirror after the film exposure after the rear blind of the shutter closes.

However, in the conventional single lens reflex camera, the mirror does not actually start moving downward immediately after the single lens reflex camera initiates lowering of the mirror. The time delay between initiating lowering of the mirror and actual mirror movement is due to the time constant of the motor which drives the mirror downward and the clearance or play between the mechanical parts in the mirror drive linkage. The time delay in lowering the mirror is particularly problematic during high-speed autofocus photography.

During high-speed autofocus photography, a short time interval between consecutive film exposures is desired. As outlined above, the film exposure cycle starts with measuring the subject range. Then, the focus lens is controlled to focus the image. Next, the mirror is raised, the shutter opens and closes and the film is exposed. The mirror is lowered and the next film exposure cycle is ready to begin. The time delay in lowering the mirror in the conventional single lens reflex camera delays the start of the range measurement during the next film exposure cycle. The start of the range measurement is delayed because the mirror is delayed in reaching the down position, the position where the mirror reflects the light to the range measuring device.

Therefore, an autofocus single lens reflex camera is needed which eliminates the effect of the time delay in lowering the mirror.

SUMMARY OF THE INVENTION

This invention therefore provides a single lens reflex camera which initiates lowering of the mirror such that the effect of the time delay present in conventional single reflex cameras is eliminated.

In a preferred embodiment of this invention, a start signal is sent to the motor which lowers the mirror before the action of the shutter blinds is complete. In other words, the motor and mirror drive linkage are activated before the rear blind closes and may be activated even before the front blind opens. This decreases the time interval between the point in time when the rear shutter closes and the point in time when the mirror reaches the down position, enabling the range measurement to begin for the next film exposure cycle. Therefore, the time between consecutive film exposures is decreased, since, in the preferred embodiments of this invention, the subject range is measured more quickly or sooner after the previous film exposure is completed.

BRIEF DESCRIPTION OF THE DRAWINGS

The invention is described in reference to the following-figures, in which like reference numerals refer to like elements, and.

DETAILED DESCRIPTION OF THE PREFERRED EMBODIMENT

Figure 1:
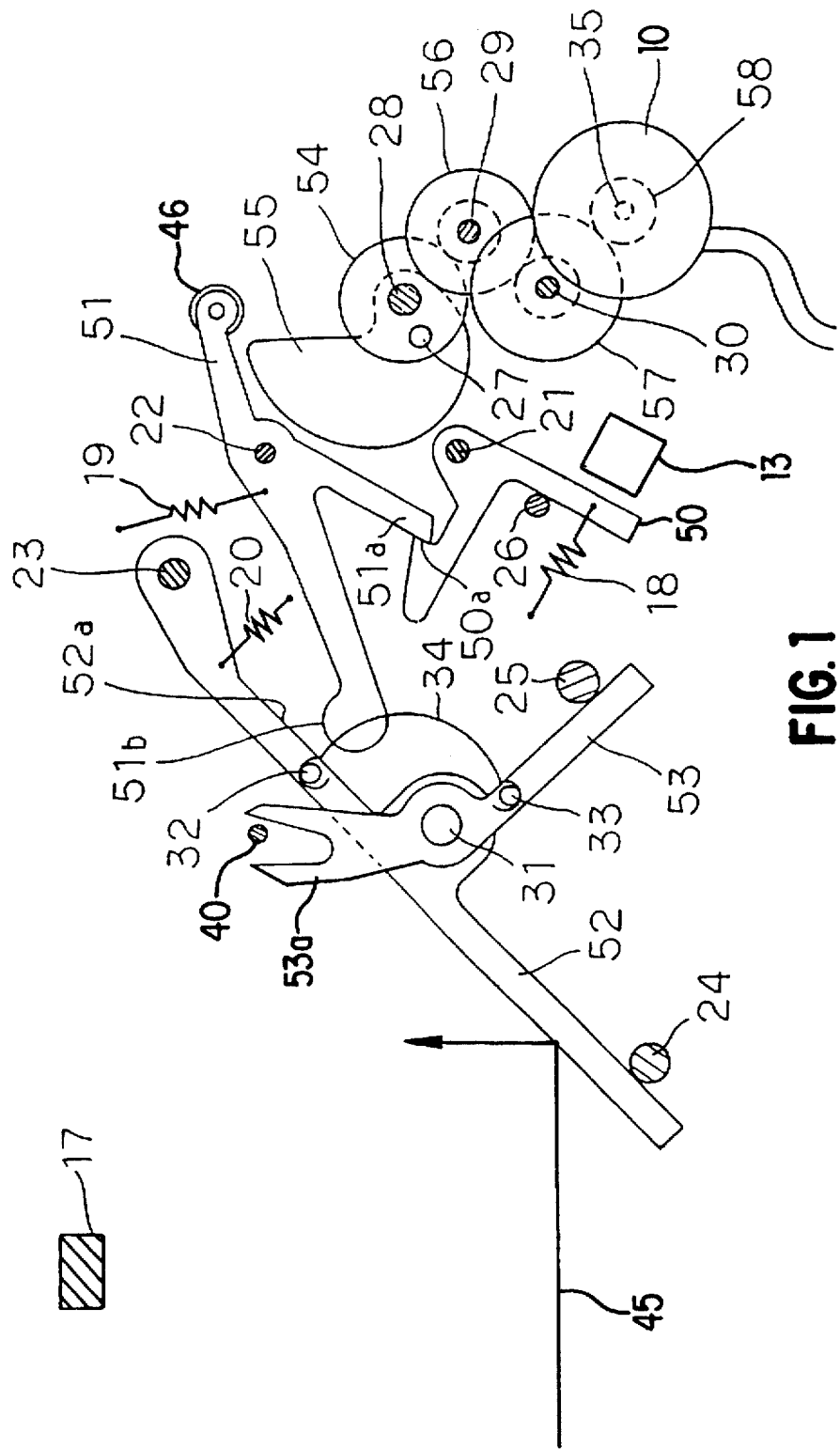
FIG. 1 is a plan side view of the mirror in the down position in a preferred embodiment of the invention.

FIG. 1 is a plan side view showing a mirror and a mirror drive apparatus in the preferred embodiment of this invention. The main mirror 52 is shown in a down position resting against the position determining pin 24, which is fixed to a camera body 1 (shown in FIG. 3). The light 45 from the photographic subject (not shown) is reflected by the main mirror 52 to a view finder. The main mirror 52 rotates around a shaft 23, which is also fixed to the camera body 1. A spring 20 urges the main mirror 52 to rotate in a counterclockwise direction around the shaft 23. An auxiliary mirror 53 rotates around a shaft 31, which is fixed to the main mirror 52. A torque spring 34 engages pins 32 and 33 fixed to the main mirror 52 and the auxiliary mirror 53, respectively. The torque spring 34 biases the auxiliary mirror 53 relative to the main mirror 52 by urging the auxiliary mirror 53 to rotate counterclockwise around the shaft 31 relative to the main mirror 52. A position determining pin 25 fixed to the camera body 1 contacts the auxiliary mirror 53 and resists the biasing force of the torque spring 34 on the auxiliary mirror 53.

A mirror up lever 51 rotates around a shaft 22, which is fixed to the camera body 1. A spring 19 urges the mirror up lever 51 to rotate clockwise around the shaft 22. The mirror up lever 51 also has a wheel 46 mounted on an end of the mirror up lever 51 opposite a mirror end 51b of the mirror up lever 51. A hook 50a on a stop lever 50 engages a stop arm 51a of the mirror up lever 51 and resists the force of the spring 19 on the mirror up lever 51. The stop lever 50 rotates around a shaft 21, which is fixed to the camera body 1. A spring 18 urges the stop lever 50 to rotate clockwise around a shaft 21 which is fixed to the camera body 1. A position determining pin 26 contacts the stop lever 50 and resists the force of the spring 18 on the stop lever 50. A release magnet 13 is capable of rotating the stop lever 50 in a counterclockwise direction by magnetic attraction sufficient to overcome the force of the spring 18 on the stop lever 50.

The mirror drive apparatus shown in FIG. 1 also includes a motor 10 which has a motor shaft 35. A pinion 58 is fixed to the motor shaft 35. A pin 27 fixes a cam 55 to a gear 54, which rotates around a shaft 28 mounted to the camera body 1. The motor 10 drives the pinion 58, which in turn drives the gear 54, and thus the cam 55, through gears 57 and 56. The gears 57 and 56 rotate around shafts 30 and 29, respectively. The shafts 30 and 29 are mounted to the camera body 1.

To raise the main mirror 52 from the down position where it rests against the position determining pin 24 to an up position, a release signal (Mg1) is sent to the release magnet 13. When the release magnet 13 is engaged by the release signal (Mg1), it causes the stop lever 50 to rotate counterclockwise against the force of the spring 18, disengaging the hook 50a a from the stop arm 51a of the mirror up lever 51. The force of the spring 19 rotates the mirror up lever 51 clockwise around the shaft 22. The mirror end 51b of the mirror up lever 51 contacts and pushes on a back surface 52a of the main mirror 52. The force of the mirror up lever 51 against the main mirror 52 causes the main mirror 52 to rotate clockwise about the shaft 23 until the main mirror 52 contacts a stopper 17 which is fixed to the camera body 1.

As the main mirror 52 begins to rotate toward the up position where it rests against the stopper 17, a fork 53a on the auxiliary mirror 53 engages a pin 40 which is fixed to the camera body 1. As the main mirror 52 continues to rotate toward the up position, the auxiliary mirror 53 rotates clockwise relative to the main mirror 52 against the force of the torque spring 34.

Figure 2:
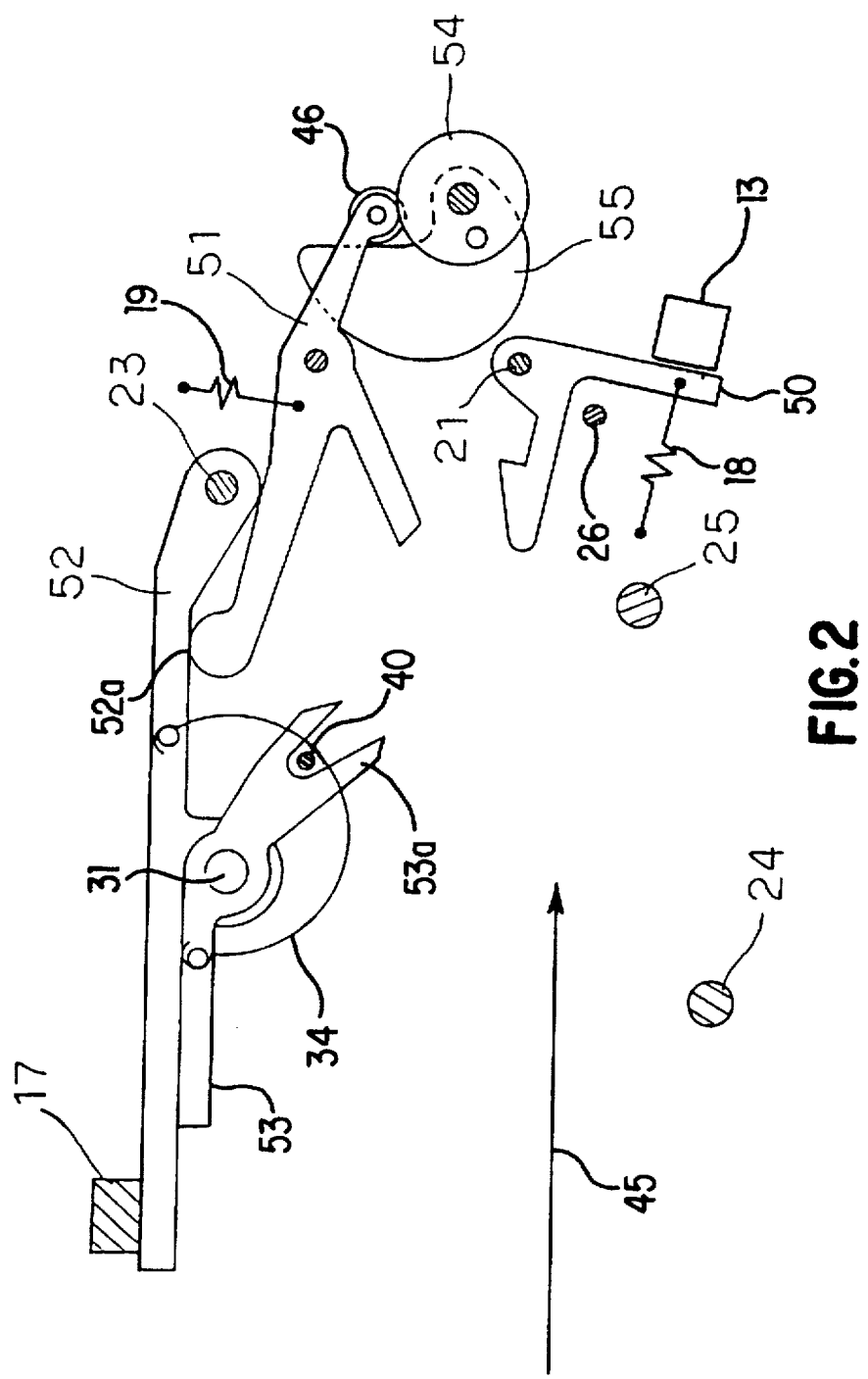
FIG. 2 is a plan side view of the mirror in the up position in the preferred embodiment of the invention.

FIG. 2 shows the main mirror 52 in the up position. When the main mirror 52 is in the up position, the light 45 is not reflected by the main mirror 52 or the auxiliary mirror 53. The main mirror 52 is held in the up position by the mirror up lever 51. The mirror up lever 51 is rotated in the clockwise direction by the spring 19 which provides sufficient force to overcome the restoring force of the spring 20 on the main mirror 52. The auxiliary mirror 53 is held in the up position by the force of the torque spring 34, which biases the auxiliary mirror 53 toward the main mirror 52. The torque spring 34 biases the auxiliary mirror 53 and the main mirror 52 together by now urging the auxiliary mirror 53 to rotate in the clockwise direction around the shaft 31.

To return the main mirror 52 to the down position, a mirror down signal MD is sent to the motor 10. In response to the mirror down signal MD, the motor 10 rotates the pinion 58, which is mounted on the motor shaft 35 of the motor 10. The motor 10 thus drives the cam 55 in a counterclockwise direction through the gears 57, 56 and 54. The cam 55 engages the wheel 46 mounted on the mirror up lever 51. The cam 55 forces the mirror up lever 51 to rotate in a counterclockwise direction around the shaft 22 until the stop arm 51a engages the hook 50a the stop lever 50. The main mirror 52 returns to the down position due to the force of the spring 20 as the mirror up lever 51 is rotated in the counterclockwise direction by the cam 55.

Figure 3:
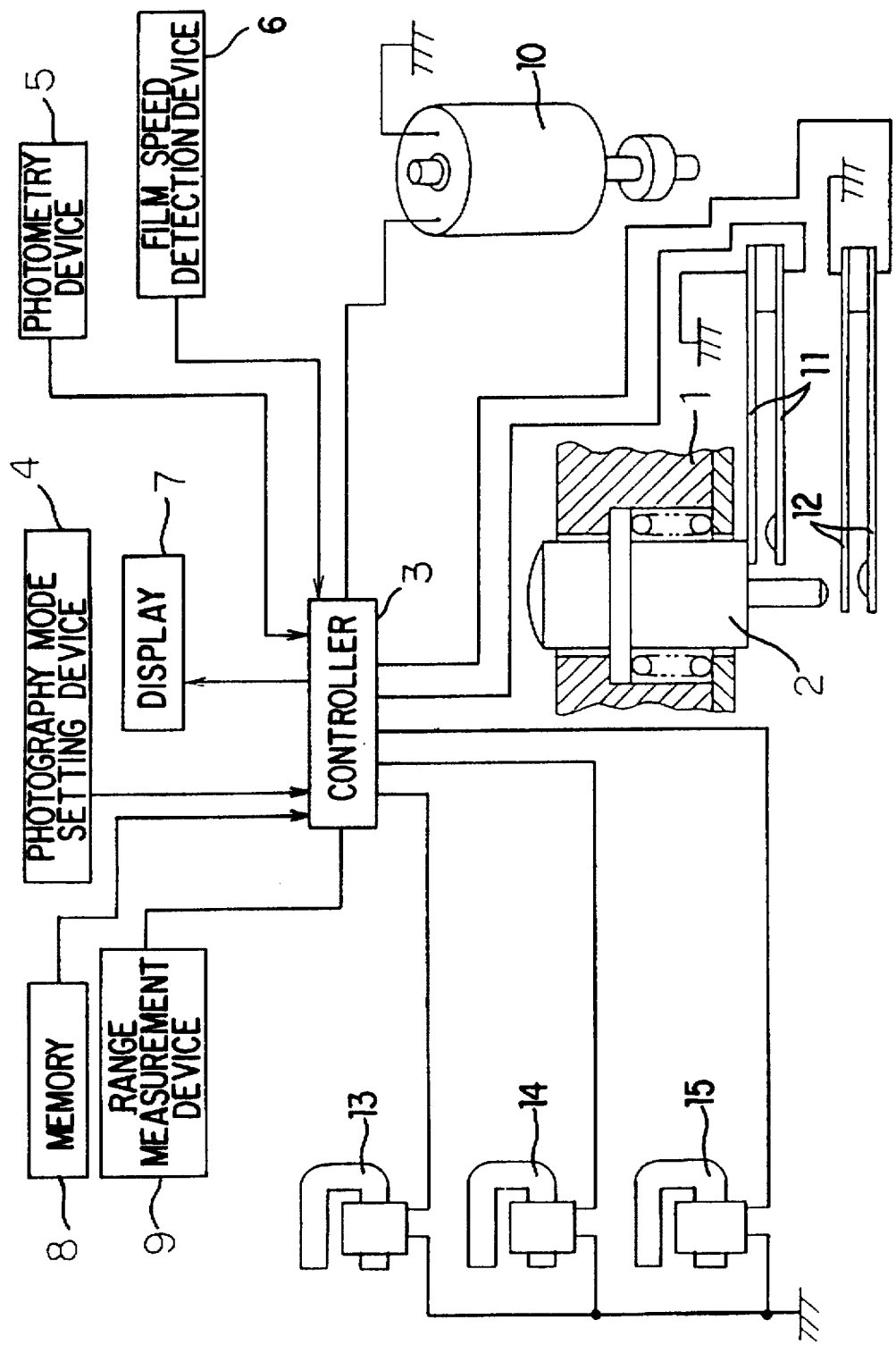
FIG. 3 is a block diagram of the mirror drive control system of the preferred embodiment of the invention.

FIG. 3 shows a block diagram of a control system for controlling the preferred embodiment of the camera shown in FIGS. 1 and 2. A controller 3 communicates with and controls the operation of a photography mode setting device 4, a photometry device 5, a film speed detection device 6, a display 7, a memory 8, a range measurement device 9, the motor 10, the release magnet 13, a front blind magnet 14 and a rear blind magnet 15. A release button 2 mounted to the camera body 1 activates a first release button switch 11 and a second release button switch 12 when the release button 2 is depressed.

In this preferred embodiment, the controller 3 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller 3 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller 3 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 7 and 8 can be used as the controller. A distributed processing architecture is preferred for maximum data/signal processing capability and speed.

The photography mode setting device 4 outputs a selection signal to the controller 3 indicating a selected photography mode in which the camera should operate. The photography mores generally include one or more of an automatic photography mode, a manual photography mode, a stop-priority automatic photography mode and a shutter-speed priority automatic photography mode. The photography modes can also include any other known photography mode.

The photometry device 5 can be any one of the many photometry devices known in the art. The photometry device 5 measures a brightness of the light 45 from the photographic subject and outputs a brightness signal to the controller 3. The film speed detection device 6 detects the speed of the film in the camera and outputs a film speed signal to the controller 3.

Based on the photography mode signal, brightness signal and the film speed signal, the controller 3 determines an exposure time and an f-stop value for the film exposure cycle. The controller 3 displays the determined exposure time and the determined f-stop value to the operator on a display 7. The controller 3 also receives range signals from a range measurement device 9 indicating the subject range of the photographic subject. The range measurement device 9 can be any one of the many range measurement devices known in the art. The controller 3 controls the focus lens (not shown) based on the range signals to focus an image of the photographic subject on the film (not shown).

The controller 3 controls the release magnet 13 to disengage the stop lever 50 from the mirror up lever 51, thus causing the main mirror 52 to move from the down position to the up position. The controller 3 also controls the front blind magnet 14 to release the front blind of the shutter (not shown). The front blind opens to expose the film to the light 45 when released by the front blind magnet 14. To stop exposing the film, the controller 3 controls the rear blind magnet 15 to release the rear blind of the shutter. When the rear blind is released by the rear blind magnet 15, the rear blind closes and stops the light 45 from reaching the film.

To expose the film, an operator partially depresses the release button 2 mounted to the camera body 1 to close the first release button switch 11. The controller 3 starts a film exposure cycle and receives signals from the photography mode setting device 4, the photometry device 5 and the film speed detection device 6. The exposure time and the f-stop values are then displayed on the display 7.

Figure 4:
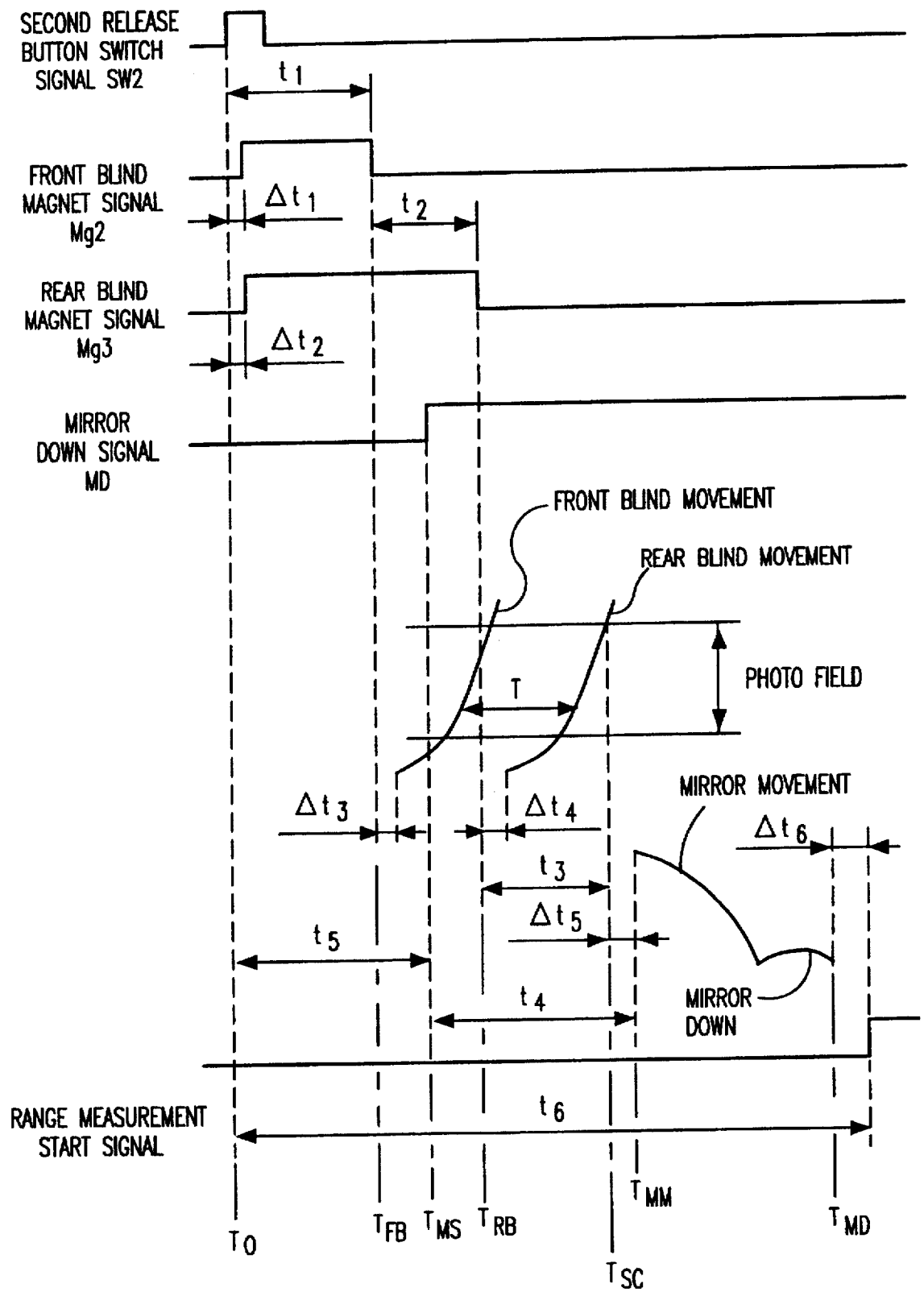
FIG. 4 is a timing diagram showing when the elements in the preferred embodiment the invention are activated in response to a first exposure condition.

As shown in FIG. 4, when the operator further depresses the release button 2 at a time $T_O$, the second release button switch 12 is closed and a second release button switch signal SW2 goes high. FIG. 4 is a timing diagram indicating when the various signals are output by or input to the controller 3 in response to a first exposure condition. An exposure condition is represented by the amount of time the film is exposed to the light 45, or the exposure time. The exposure time is affected by many factors including the film speed, ambient light conditions, camera shutter speed, whether a flash is used or not, the type and magnification of the lenses in the camera, and the like. In the first exposure condition shown in FIG. 4, the time interval T is the exposure time.

The controller 3 inputs the high second release button switch signal SW2 from the second release button switch 12 and sends the release signal Mg1 (not shown in FIG. 4) to the release magnet 13, which releases the main mirror 52 to the up position as described above. Range measurements are no longer sent to the controller 3 by the range measurement device 9 since the main mirror 52 is in the up position and the light 45 is no longer reflected to the range measurement device 9.

Before the second release button switch 12 is closed, the front shutter blind and the rear shutter blind are mechanically held in a closed position and open position, respectively, by mechanical engagement stops (not shown). As shown in FIG. 4, after the second release button switch signal SW2 goes high, the controller 3 sets the signals to the front blind magnet 14 and the rear blind magnet 15 to high after first and second time delay intervals $\Delta t1$ and $\Delta t2$, respectively. The controller 3 sets the front blind magnet signal Mg2 and the rear blind magnet signal Mg3 to high, thus energizing the front and rear blind magnets 14 and 15. When energized, the front blind magnet 14 and the rear blind magnet 15 bind the respective front and rear shutter blinds. Once the front shutter blind is held in place by the front blind magnet 14 and the rear shutter blind is held in place by the rear blind magnet 15, the controller 3 releases the mechanical engagement stops.

At a time $T_{FB}$, which is after a first time interval t1 has elapsed since the second release button switch signal SW2 went high at the time $T_O$, the controller 3 releases the front blind by setting the front blind magnet signal Mg2 to the front blind magnet 14 low. The front blind magnet 14 thus releases the front blind. In response, the front blind opens the photo field, starting the film exposure. The photo field is the shutter opening, which is equivalent to the area of the film exposed to the light 45.

At a time $T_{MS}$, which is after a fifth time interval t5 has elapsed since the second release button switch signal SW2 went high, the controller 3 sets the mirror down signal MD high. In response to the mirror down signal MD going high, the motor 10 begins to drive the main mirror 52 from the up position to the down position.

At a time $T_{RB}$, which is after a second time interval t2 has elapsed since the controller 3 set the front blind signal Mg2 low at time $T_{FB}$, the controller 3 releases the rear blind by setting the rear blind magnet signal Mg3 low. The rear blind magnet 15 releases the rear blind and the rear blind closes, ending the film exposure. The exposure time interval T is equal to the second time interval t2 plus the difference between third and fourth time delay intervals $\Delta t3$ and $\Delta t4$. The third time delay interval $\Delta t3$ is the time delay between the time $T_{FB}$ when the controller 3 sets the front blind magnet signal Mg2 low and when the front blind actually begins to move. Likewise, the fourth time delay interval $\Delta t4$ is the time delay between the time $T_{RB}$ when the controller 3 sets the rear blind magnet signal Mg3 low and the time when the rear blind actually begins to move.

The third time interval t3 is the time interval between the time $T_{RB}$ when the controller 3 sets the rear blind magnet signal Mg3 low and a time $T_{SC}$ when the rear blind actually closes the photo field. The fifth time delay interval $\Delta t5$ is a time interval or cushion between the time $T_{SC}$ when the rear blind closes the photo field and a time $T_{MM}$ when the main mirror 52 actually starts to move downward. The fifth time delay interval or cushion $\Delta t5$ ensures that the main mirror 52 does not interfere with the light 45 during the film exposure. A fourth time interval t4 is the time interval from the time $T_{MS}$ when the controller 3 sets the mirror down signal MD high to the time $T_{MM}$ when the main mirror 52 actually starts moving downward.

At a time $T_{MD}$, the main mirror 52 reaches the down position. After a sixth time interval t6 elapses since the second release button switch signal SW2 went high, the controller 3 sets the range measurement start signal high. In response to the range measurement start signal going high, the range measurement device 9 starts measuring the range to the subject. The sixth time delay interval $\Delta t6$ is a time cushion which ensures that the range measurement device 9 does not start measuring the subject range before the main mirror 52 reaches the down position.

As discussed above, the time interval t5 is the time interval between the time $T_O$ when the second release button switch signal SW2 goes high and the time $T_{MS}$ when the controller 3 sets the mirror down signal MD high, and is determined by Equation (1):

$$t5 = t1 + t2 + t3 + \Delta t5 - t4 \tag{1}$$

Setting the mirror down signal MD low at the time $T_{MS}$ which occurs only after the time interval t5 elapses from when the second release button switch signal SW2 goes high, ensures that the main mirror 52 actually starts moving downward after the time cushion $\Delta t5$ has passed after the rear blind closes the photo field. Therefore, the main mirror 52 starts to move downward as soon as possible after the film exposure is completed.

Figure 5:
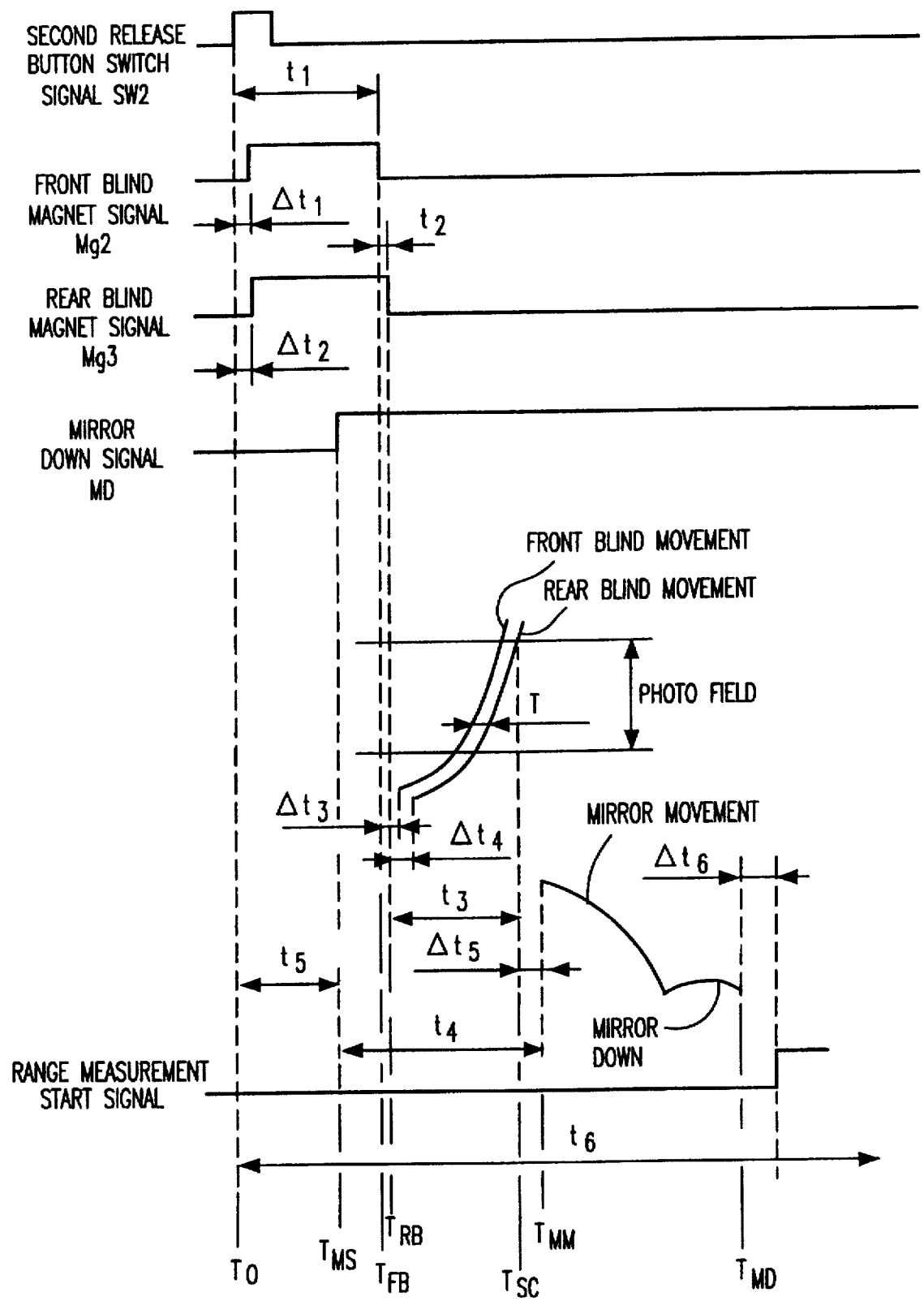
FIG. 5 is a timing diagram showing when the elements in the preferred embodiment of the invention are activated in response to a second exposure condition.
Figure 6:
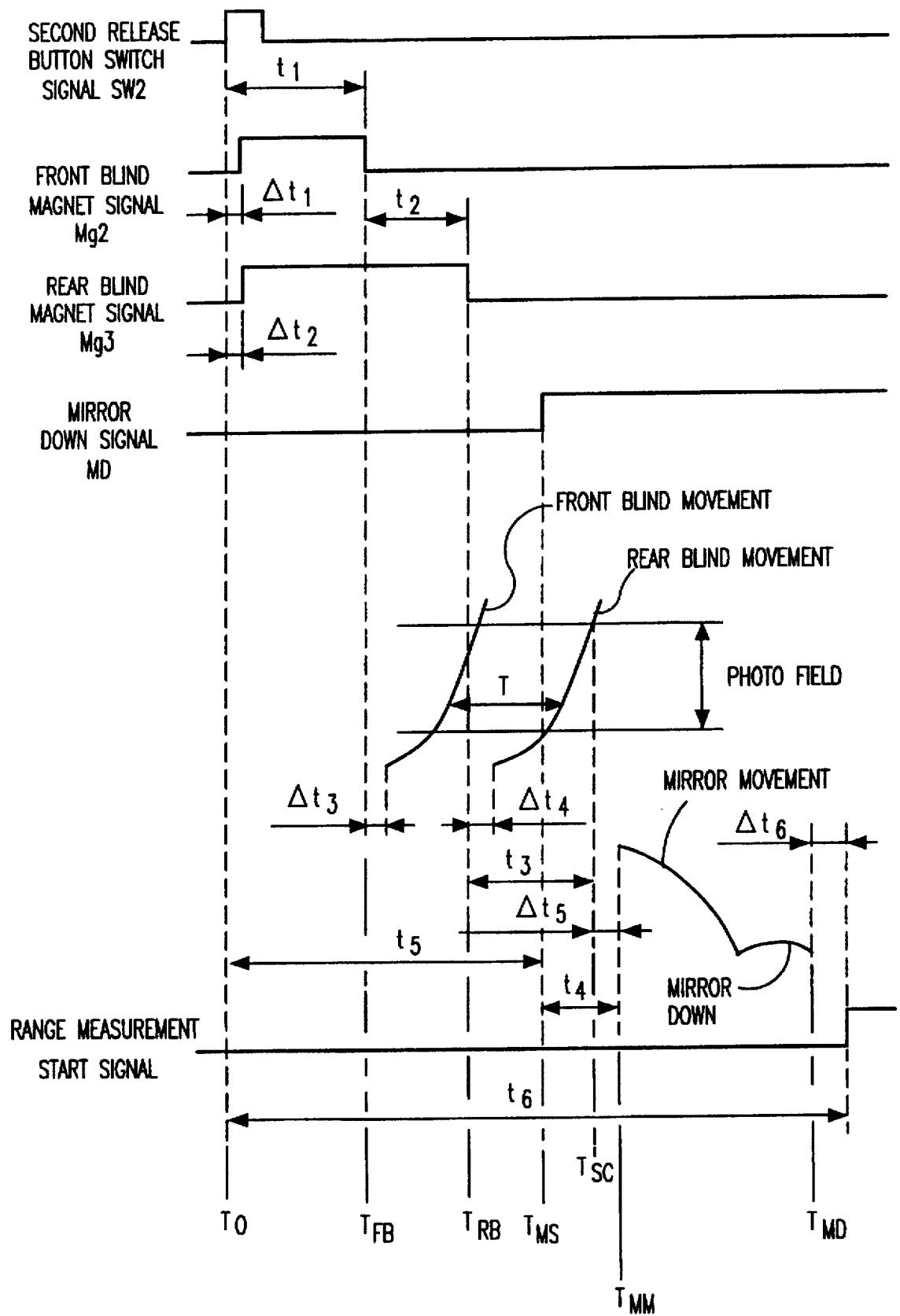
FIG. 6 is a timing diagram showing when the elements in the preferred embodiment of the invention are activated in response to a third exposure condition.

FIG. 4 shows a first example, where the photographic conditions require the controller 3 to set the mirror down signal MD high at the time $T_{MS}$, which is after the time $T_{FB}$ when the controller 3 sets the front blind magnet signal Mg2 low and before the time $T_{RB}$ when the controller 3 sets the rear blind magnet signal Mg3 low. FIG. 5 shows a second example, where the photographic conditions require the controller 3 to set the mirror down signal MD high at time $T_{MS}$, which is before both the time $T_{FB}$ when the controller 3 sets the front blind magnet signal Mg2 low and before the time $T_{RB}$ when the controller 3 sets the rear blind magnet signal Mg3 low. FIG. 6 shows a third example, where the photographic conditions require the controller 3 to set the mirror down signal MD high at the time $T_{MS}$, which is after the time $T_{FB}$ when the controller 3 sets the front blind magnet signal Mg2 low and after the time $T_{RB}$ when the controller sets the rear blind magnet signal Mg3 low.

Regardless of the photographic conditions, however, the controller 3 outputs the front and rear blind magnet signals Mg2 and Mg3 to the front blind magnet 14 and the rear blind magnet 15 and outputs the mirror down signal MD to the motor 10 such that the main mirror 52 always starts to move downward at time $T_{MM}$, which is no later than the fifth time delay interval $\Delta t5$ after the rear blind closes the photo field at time $T_{SC}$. This assures that the controller 3 is able to set the range measurement start signal high as soon as possible after the film exposure is completed.

Figure 7:
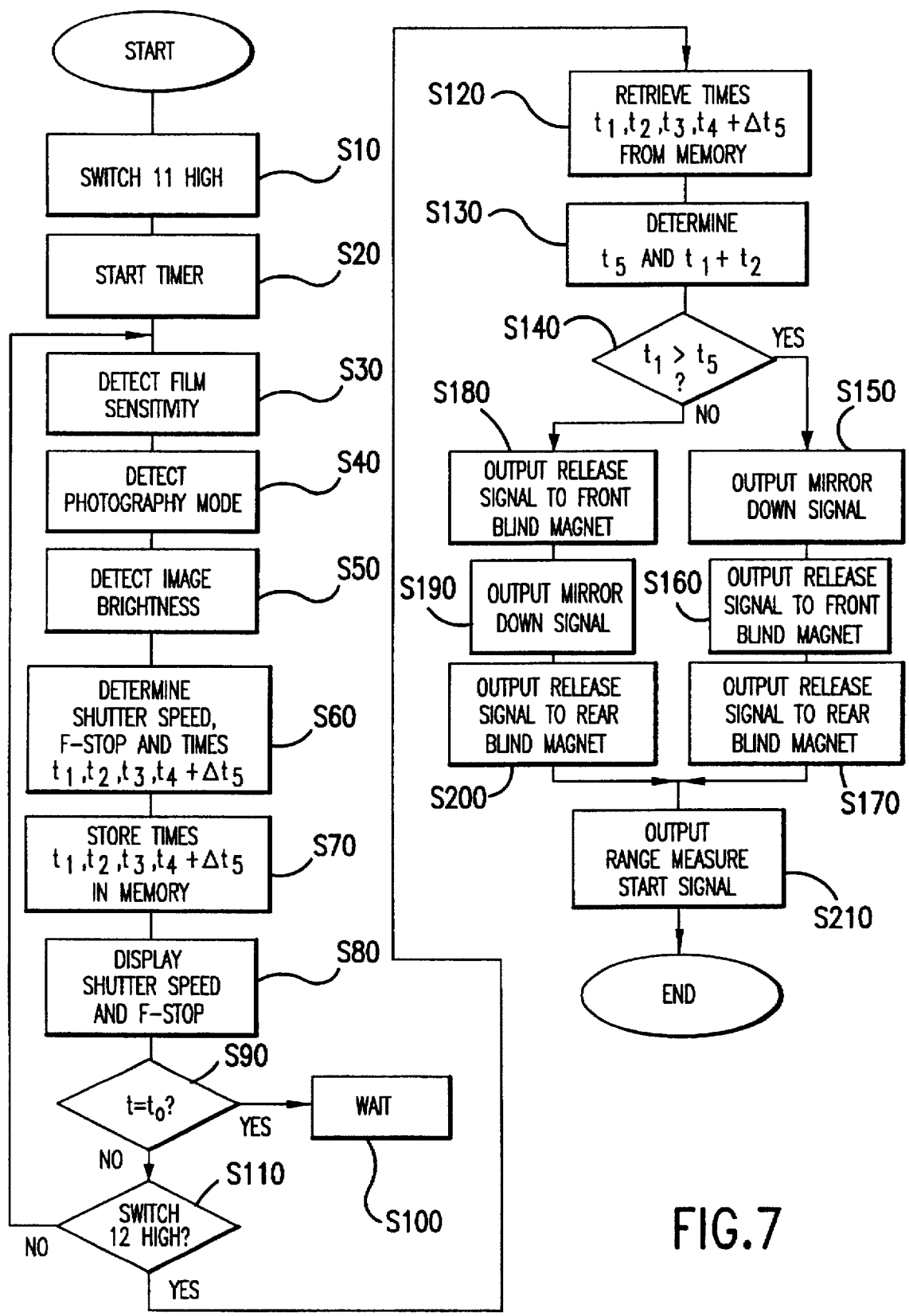
FIG. 7 is a flowchart outlining a first preferred embodiment of the method for controlling the preferred embodiment of the invention.

FIG. 7 is a flowchart outlining a first preferred method for controlling the preferred embodiment of the camera of this invention. In step S10, the film exposure cycle starts when the first release button switch 11 closes and the first release button switch signal SW1 goes high. In step S20, the controller 3 starts a timer. In step S30, the controller 3 inputs the film speed signal detected by the film speed detection device 6. In step S40, the controller 3 inputs the photography mode signal, which indicates the photography mode selected using the photography mode setting device 4. In step S50, the controller 3 inputs the brightness signal detected by the photometry device 5. In step S60, the controller 3 determines the shutter speed, the f-stop value and the time intervals t1, t2, t3, t4 and $\Delta t5$ based on the film speed signal, the photography mode signal and the brightness signal. The shutter speed, the f-stop value and the time intervals are determined by methods well known in the art. In step S70, the time intervals t1, t2 t3, t4 and $\Delta t5$ are stored in the memory 8.

In step S80, the controller 3 displace the shutter speed and the f-stop value on the display 7. In step S90, the controller 3 determines if the timer has reached a time t0. If time t0 has been reached, the control jumps to step S100 and the controller 3 enters a wait state. If time t0 has not been reached, the controller 3 determines in step S110 if the second release button switch signal SW2 is high. If the second release button switch signal SW2 is not high, control Jumps back to step S30. Otherwise, control proceeds to step S120.

In step 8120, the controller 3 retrieves the time intervals t1, t2, t3, t4 and $\Delta t5$ from the memory 8. In step S130, the controller 3 determines the time interval t5 as described above, and the time interval (t1+t2). In step S140, the controller 3 compares the time intervals t1 and t5. If the time interval t1 is greater than the time interval t5, control continues to step S150. Otherwise, control jumps to step S180. The condition where the time interval t1 is greater than the time interval t5 is shown in FIG. 5.

In step S150, the controller 3 sets the mirror down signal MD high after the time interval t5 elapses after the second release button switch signal SW2 goes high. In step S160, the controller 3 sets the front blind magnet signal Mg2 low after the time interval t1 elapses after the second release button switch signal SW2 goes high at the time $T_O$. In step S170, the controller 3 sets the rear blind magnet signal Mg3 low after the time interval (t1+t2) elapses after the second release button switch signal SW2 goes high at the time $T_O$. Control then jumps to step S210

If the time interval t1 is not greater than the time interval t5, i.e. the condition shown in FIG. 4, control jumps from step S140 to step S180. In step S180, the controller 3 sets the front blind magnet signal Mg2 low after the time interval t1 elapses after the second release button switch signal SW2 goes high at the time $T_O$. In step S190, the controller 3 sets the mirror down signal MD high after the time interval t5 elapses after the second release button switch signal SW2 goes high at the time $T_O$. In step S200, the controller 3 sets the rear blind magnet signal Mg3 low after the time interval (t1+t2) elapses after the second release button switch signal SW2 goes high at time $T_O$. Control then continues to step S210. In step S210, the controller 3 outputs the range measurement start signal after the time interval t6 elapses after the second release button signal SW2 goes high at the time $T_O$. In response, the range measurement device 9 begins measuring the range of the subject. Following step S210, the control of the single lens reflex camera continues according to well known methods.

Figure 8:
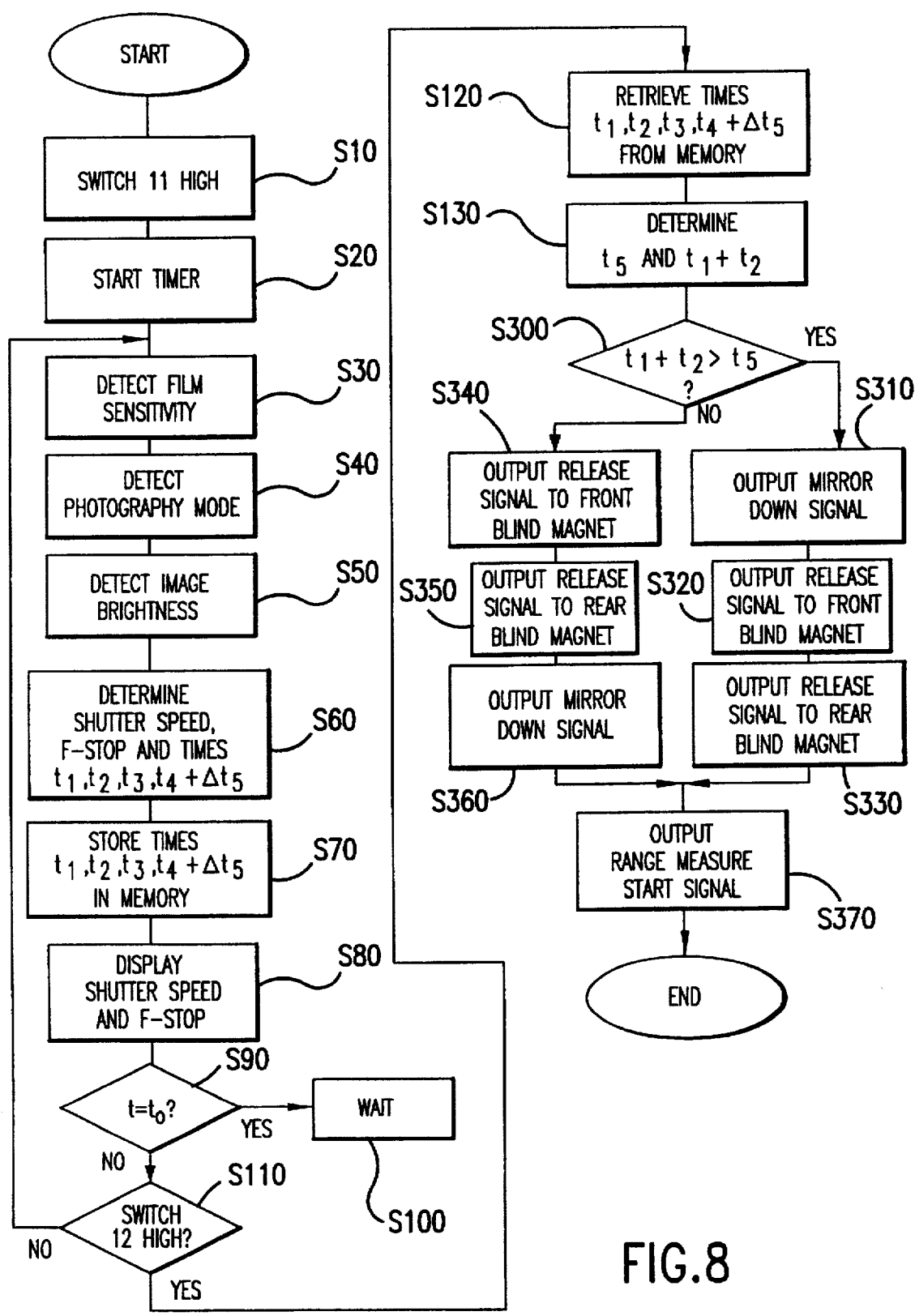
FIG. 8 is a flowchart outlining a second preferred embodiment of the method for controlling the preferred embodiment of the invention.

FIG. 8 is a flowchart outlining a second preferred method for controlling of the preferred embodiment of the camera of this invention. Steps S10 through S130 are identical to steps S10 to S130 of the first preferred embodiment of the method, except after step S130, control jumps to step S300. In step S300, the controller 3 compares the sum of the time interval t1 and the time interval t2 (t1+t2) to the time interval t5. If the sum (t1+t2) of the time intervals t1 and t2 is greater than the time interval t5, control continues to step S310. Otherwise, control jumps to step S340. The exposure condition where the sum (t1+t2) of the time intervals t1 and t2 is greater than time t5 is shown in FIG. 5.

in step S310, the controller 3 sets the mirror down signal MD high after the time interval t5 elapses after the second release button switch signal SW2 goes high at the time $T_O$. In step S320, the controller 3 sets the front blind magnet signal Mg2 low after the time interval t1 elapses after the second release button switch signal SW2 goes high at the time $T_O$. In step S330, the controller 3 sets the rear blind magnet signal Mg3 low after the time interval (t1+t2) elapses after the second release button switch signal SW2 goes high at the time $T_O$. Control then Jumps to step S370.

If the sum (t1+t2) of the time intervals t1 and t2 is not greater than the time interval t5, i.e. the condition shown in FIG. 6, control Jumps from step S300 to step S340. In step S340, the controller 3 sets the front blind magnet signal Mg2 low after the time interval t1 elapses after the second release button switch signal SW2 goes high at the time $T_O$. In step S350, the controller 3 sets the rear blind magnet signal Mg3 low after the time interval (t1+t2) elapses after the second release button switch signal SW2 goes high at the time $T_O$. In step S360, the controller 3 sets the mirror down signal MD high after the time interval t5 elapses after the second release button switch signal SW2 goes high at the time $T_O$. Control then continues to step S370. In step S370, the controller 3 outputs the range measurement start signal after the time interval t6 elapses after the second release button signal SW2 goes high at the time $T_O$. In response, the range measurement device 9 begins measuring the range of the subject. Following step S370, the control of the single lens reflex camera continues according to well known methods.

While this invention has been described above with reference to specific embodiments, this description of the specific embodiments is illustrative only and is not to be construed as limiting the scope of the invention. Various other modifications and changes may occur to those skilled in the art without departing form the spirit and scope of the invention as set forth in the following claims.

What is claimed is:

1. A single lens reflex camera comprising:

a lens;

a mirror for reflecting light entering the lens, the mirror having a light reflecting position and a light non-reflecting position;

detecting means which detects the start of an exposure cycle and outputs a start signal;

a mirror drive mechanism for driving the mirror between the light reflecting position and the light non-reflecting position;

a shutter having an aperture, the shutter comprising a front blind and a rear blind, the front blind moving to open the aperture and begin an exposure and the rear blind moving to close the aperture and end the exposure;

a controller controlling the mirror drive mechanism, the front blind and the rear blind, the controller comprising calculating means responsive to the start signal for calculating the positions of the front blind, the rear blind and the mirror, the controller outputting a mirror down signal to the mirror drive mechanism to move the mirror from the light non-reflecting position to the light reflecting position;

wherein the controller outputs the mirror down signal to the mirror drive mechanism before the shutter aperture is fully closed by the rear blind.

2. The single lens reflex camera of claim 1, wherein the controller outputs the mirror down signal to the mirror drive mechanism before the rear blind begins to close the shutter aperture.

3. The single lens reflex camera of claim 1, wherein the controller outputs the mirror down signal to the mirror drive mechanism before the front blind fully opens the shutter aperture.

4. The single lens reflex camera of claim 1, wherein the controller outputs the mirror down signal to the mirror drive mechanism before the front blind begins to open the shutter aperture.

5. The single lens reflex camera of claim 1, wherein the controller outputs the mirror down signal at a mirror down time, the controller determining the mirror down time based on a time difference between when the rear blind closes the aperture and a time delay, the time delay being a difference between a time when the controller outputs the mirror down signal to the mirror drive and a time when the mirror actually begins moving from the light non-reflecting position to the light reflecting position.

6. A single lens reflex camera comprising:

a lens;

a mirror for reflecting light entering the lens, the mirror having a light reflecting position and a light non-reflecting position;

detecting means which detects the start of an exposure cycle and outputs a start signal;

a mirror drive mechanism for driving the mirror between the light reflecting position and the light non-reflecting position;

a shutter having an aperture, the shutter comprising a front blind and a rear blind, the front blind moving to open the aperture and begin an exposure and the rear blind moving to close the aperture and end the exposure and;

a controller controlling the mirror drive mechanism, the front blind and the rear blind, the controller comprising calculating means responsive to the start signal for calculating the positions of the front blind, the rear blind and the mirror, the controller outputting a mirror down signal to the mirror drive mechanism to move the mirror from the light non-reflecting position to the light reflecting position;

wherein the controller outputs the mirror down signal at a mirror down time, the controller determining the mirror down time based on a time difference between when the rear blind closes the aperture and a time delay, the time delay being a difference between a time when the controller outputs the mirror down signal to the mirror drive and a time when the mirror actually begins moving from the light non-reflecting position to the light reflecting position.

7. The single lens reflex camera of claim 6, wherein the controller outputs the mirror down signal to the mirror drive mechanism before the shutter aperture is fully closed by the rear blind.

8. The single lens reflex camera of claim 6, wherein the controller outputs the mirror down signal to the mirror drive mechanism before the rear blind begins to close the shutter aperture.

9. The single lens reflex camera of claim 6, wherein the controller outputs the mirror down signal to the mirror drive mechanism before the front blind fully opens the shutter aperture.

10. The single lens reflex camera of claim 6, wherein the controller outputs the mirror down signal to the mirror drive mechanism before the front blind begins to open the shutter aperture.

11. A single lens reflex camera comprising:

lens means;

mirror means for reflecting light entering the lens means, the mirror means having a light reflecting position and a light non-reflecting position;

detecting means which detects the start of an exposure cycle and outputs a start signal;

mirror drive means for driving the mirror means between the light reflecting position and the light non-reflecting position;

shutter means having an aperture, the shutter means comprising front blind means and a rear blind means, the front blind means opening the aperture and the rear blind means closing the aperture and;

control means for controlling the mirror drive means, the front blind means and the rear blind means, the control means comprising calculating means responsive to the start signal for calculating the positions of the front blind means, the rear blind means and the mirror means, the control means controlling the mirror drive means to move the mirror means from the light non-reflecting position to the light reflecting position;

wherein the control means controls the mirror drive means to move the mirror means, the control means initiating activation of the mirror drive means after the start signal and before the shutter aperture is completely closed by the rear blind means.

12. The single lens reflex camera of claim 11, wherein the control means controls the mirror drive means to move the mirror means, the control means initiating activation of the mirror drive means before the rear blind means begins to close the shutter aperture.

13. The single lens reflex camera of claim 11, wherein the control means controls the mirror drive means to move the mirror means, the control means initiating activation of the mirror drive means before the front blind means fully opens the shutter aperture.

14. The single lens reflex camera of claim 11, wherein the control means controls the mirror drive means to move the mirror means, the control means activating of the mirror drive means before the front blind means begins to open the shutter aperture.

15. The single lens reflex camera of claim 11, wherein the control means activates the mirror drive means at a mirror down time, the control means determining the mirror down time based on a difference between a first time when the rear blind means closes the aperture and on a time delay, the time delay being a difference between a time when the control means controls the mirror drive means to move the mirror means and a second time when the mirror means actually begins moving from the light non-reflecting position to the light reflecting position.

16. A method for controlling a single lens reflex camera comprising the steps of:

controlling a front shutter blind to open a shutter aperture;

controlling a rear shutter blind to close the shutter aperture; and controlling a mirror drive mechanism to move a mirror from a light non-reflecting position to a light reflecting position;

detecting the start of an exposure cycle and sending a start signal;

wherein activation of the mirror drive mechanism is initiated after the start signal and before the rear shutter blind fully closes the shutter aperture.

17. A method for controlling a single lens reflex camera of claim 16, wherein activation of the mirror drive mechanism is initiated before the rear shutter blind begins to close the shutter aperture.

18. A method for controlling a single lens reflex camera of claim 16, wherein activation of the mirror drive mechanism is initiated before the front shutter blind fully opens the shutter aperture.

19. A method for controlling a single lens reflex camera of claim 16, wherein activation of the mirror drive mechanism is initiated before the front shutter blind begins to open the shutter aperture.

* * * * *